United States Patent [19]

Murray

[11] Patent Number: 4,968,897

[45] Date of Patent: Nov. 6, 1990

[54] AUTOMATIC BY-PASS SWITCHING DEVICE

[76] Inventor: Mickey R. Murray, P.O. Box 245, Paradise, Calif. 95967

[21] Appl. No.: 459,475

[22] Filed: Jan. 2, 1990

[51] Int. Cl.[5] .......... H02H 3/20

[52] U.S. Cl. .......... 307/112; 307/113; 361/56

[58] Field of Search .......... 307/112, 113, 116; 361/1, 54, 56; 215/88, 89, 90, 91, 93

[56] References Cited

U.S. PATENT DOCUMENTS

| | | | |
|---|---|---|---|
| 340,717 | 4/1886 | Holt | 315/90 |
| 2,809,329 | 10/1957 | Stier | 315/90 |
| 4,382,209 | 5/1983 | Louccides | 315/93 X |
| 4,727,449 | 2/1988 | Fleck | 315/122 X |

*Primary Examiner*—Derek S. Jennings

[57] ABSTRACT

An automatic by-pass switch placed in the circuit on the secondary side of a transformer, one switch in series with each lamp of a series connected lighting circuit. The by-pass switching unit contains two normally closed, openable contacts and two strips of metal which serve as conductive current flow paths for the normally closed contacts. The two metal strips are placed in close spaced proximity to each other with air space therebetween so that the path of least resistance for the current flow is through the normally closed contacts and through the adjacent functioning lamp. If the functioning lamp burns out, the path of least resistance for the current flow becomes across the air space between the two metal strips. The electricity begins to arc across the metal strips. The heat generated by the arcing causes the metal strips to soften. Positioned on the backside of each metal strip is a compression spring applying pressure to bend the softened strips towards each other. As the metal strips bend toward each other, the two normally closed contacts are opened, and a new non-arcing flow path is created through the contacting of the two metal strips against each other. This new flow path allows the passage of current to the remaining by-pass switching devices and lamps in the circuit.

3 Claims, 6 Drawing Sheets

AUTOMATIC BY-PASS SWITCHING DEVICE

BACKGROUND OF THE INVENTION

1. Field of the Invention:

This invention relates to by-pass circuitry for use with electro-receptive devices. More particulary the invention is an automatic by-pass switching device for use with series connected illuminants, specifically, neon sign lamps and the relatively high voltages associated therewith. The invention automatically shunts around a neon lamp at the time the lamp burns out, in order to provided an alternative circuit to allow continued operation of the remaining lamps in the series circuit.

2. Description of the prior art:

Series connected lamps have been in wide use for many years. A well known problem associated with series circuited lighting is that if one lamp becomes inoperative, the entire circuit is interrupted and the remaining lamps in the circuit cease to function until the defective lamp is replaced and the circuit is again completed. Under the condition of all the lamps being inoperable due to one or more defective lamps, it is difficult and sometimes dangerous to ascertain which is the defective lamp since all the lamps are inoperative. It is not uncommon for a technician to receive a hazardous shock during testing for the defective lamp since most testing procedures are most readily performed with the power on. Also, when a series circuited neon lamp arrangement ceases to function due to one or more defective lamps, the transformer continues stepping the primary voltage to a higher secondary voltage with typical neon transformers having open circuit transformer voltages of about 12,000 volts, whereas operating voltages of the same transformer with functioning lamps will typically be around 6,500 volts. 12,000 volts will arc much further than 6,500 volts, and in the description of my invention, it will be shown how I have taken advantage of the greater arcing distance of the higher voltage of the open circuit transformer.

Over the years, several devices and circuits have been invented to automatically by-pass defective lamps in series lighting circuits to allow the remaining lamps to continue burning, making it simple and safe to locate the defective lamp. However, for one reason or another, few if any of such by-pass devices and circuits are currently used in the U.S. for neon lighting, and none appear to be as feasible or structured the same as my by-pass switching device.

A patent issued to A. J. Holt on Apr. 27, 1886, U.S. Pat. No. 340,717 teaches a "multiple series system of electrical distribution" which includes the teaching of an automatic cut-out or shunt mechanism which uses an armature with an electromagnet to shunt around one or more defective lamps.

A patent issued to William C. Fleck on Feb. 23, 1988, U.S. Pat. No. 4,727,449 teaches a "filament bypass circuit" for use with a string of lamps connected in series. Each lamp is provided with a shunt circuit consisting of a series circuit of a diode and a silicon bilateral voltage triggered switch. The switch becomes conductive upon the application of a substantial increase in voltage from the A.C. source and remains conductive until there is an interruption of the current flow or the current flow drops below its required holding value.

In a patent issued to H. J. Stier et al in Oct. 1957, U.S. Pat. No. 2,809,329, a "series lamp circuit with normal and stand-by lamps" is taught. In the Stier disclosure, a film cut-out is used as a by-pass switching device to shunt around a burned-out lamp. Film cut-outs are structured with an insulating plastic film placed in series between two conductors. When a lamp of the circuit burns out, the voltage of the circuit will rise sufficiently to burn through the plastic insulator to reestablish the circuit. It has been found that this type of by-pass switching device usually emits radio frequency waves while in the by-pass mode. The emitted radio waves cause static in nearby radios and thus the film cut-out switch is not a desireable switching unit. When the film is burned through by the electricity, insulator film is left around the burned hole through the insulating film. The insulating material around the hole prohibits a complete and solid contact between the conductors on each side of the film. Consequently, the current flowing through the switching unit in the by-pass mode will usually be flowing with a small degree of arcing between the two conductors of the by-pass switch. It is the arcing caused by the generally loose connection between the two conductors of the switching unit which creates the radio waves.

Of the past art devices and circuitry examined in the patent search which were designed to automatically by-pass a defective illuminant in a series circuit, several used either motors and electromagnets in combination with armatures, while others used solid state electronics, or burnt film cut-out switches to perform the switching. None of the known by-pass switches for series wired lighting appeared to be structured similar, or to function in the same manner as my by-pass switching device.

SUMMARY OF THE INVENTION

In practicing my invention, I have developed a simple yet effective automatic switching unit for placement in the secondary circuit of a transformer. One by-pass switching unit is connected in series with each lamp of a series connected lighting circuit having two or more lamps. My switching device is primarily for use with neon lamps of the type used in the sign industry and the relatively high voltages associated therewith. A transformer used with this type of lighting will typically have an open circuit voltage of about 12,000 volts, and an operating voltage of about 6,500 volts. Of course these voltages will vary somewhat from one system to another depending on a number of factors such as the number of lamps and their lengths in the circuit. EMF of 12,000 volts has the ability to jump or arc approximately ½", whereas 6,500 volts will arc considerably less distance.

My by-pass switching unit contains two normally closed, openable contacts formed by the connecting of two strips of metal against the ends of wires. One metal strip is connected in series with a conductor leading to a lamp, and the other metal strip is connected in series with the return path conductor leading from the same said lamp. The term normally closed refers to the position of the contacts during normal operation mode with an operating lamp of the lighting circuit. The two metal strips are placed in close spaced proximity to each other with sufficient air space therebetween so that the path of least resistance for the current flow is through the metal strips, the normally closed contacts, and then through the wires and adjacent functioning lamp. The spacing between the metal strips is adequate to prohibit arcing by the lower voltages typically associated with operating voltages of transformers powering operating illuminants, and the resistivity of the circuit conductors and functioning lamp is far less than the air space between the strips. If however the lamp burns out, the path of least resistance for the open circuit transformer voltage and current flow to the next lamp or lamps in the circuit becomes across the air space between the two metal strips. This arcing across the two metal strips of course occurs only in the absence of any other flow path of a lessor resistivity than the air space between the two metal strips. With the much higher open circuit transformer voltage of about 12,000 volts, the electricity will begin to arc across the metal strips. The heat generated in the strips by the arcing causes the metal strips to quickly soften. The alloy of the metal strips is particulary formulated to soften with the heat of the arcing.

Positioned on the backside of each metal strip is a compression spring applying pressure to bend the soft strips towards each other. The springs are not sufficiently strong to bend the metal strips unless the strip have been softened as the result of heating by the arcing. As the heated metal strips bend toward each other, the two normally closed contacts of the switching unit are opened, and a new non-arcing flow path is created through the solid and tight contacting of the two metal strips against each other assisted by way of pressure from the springs. This new current flow path allows the continued passage of electricity to the remaining lamps in the circuit, and the inoperable lamp has been taken out of the circuit by the opening of the normally closed contacts. When the inoperable lamp is replaced by a serviceman, the effected by-pass switch must also be replaced in order install a new by-pass switching unit having the normally closed contacts for use with an operating lamp. One by-pass switch unit is used in series with each lamp of the circuit, for example, a four lamp series circuit will use four by-pass switching units. One normally closed contact of the by-pass switching unit is placed in series with the input line to a lamp, and the other normally closed contact of the same said by-pass switching unit is placed in series with the return line of the same said lamp.

It is therefore a primary object of my invention to provide an automatic by-pass switching device for use in series connected lighting circuits to disconnect a defective lamp and to allow continued operation of the remaining lamps of the circuits.

It is a further object of my invention to provide an automatic by-pass switching device which utilizes the ability of electricity to arc at certain voltages to activate the by-pass action of the switching device.

It is yet a further object of my invention to provide the above in a simple to use and inexpensive to manufacture by-pass switching unit.

Other objects of my invention will be understood, and a better understanding of the preferred structuring of the device will be gained with a reading of the remaining specification and an examination of the appended drawings.

DESCRIPTION OF THE PREFERRED EMBODIMENT

Figure 1:
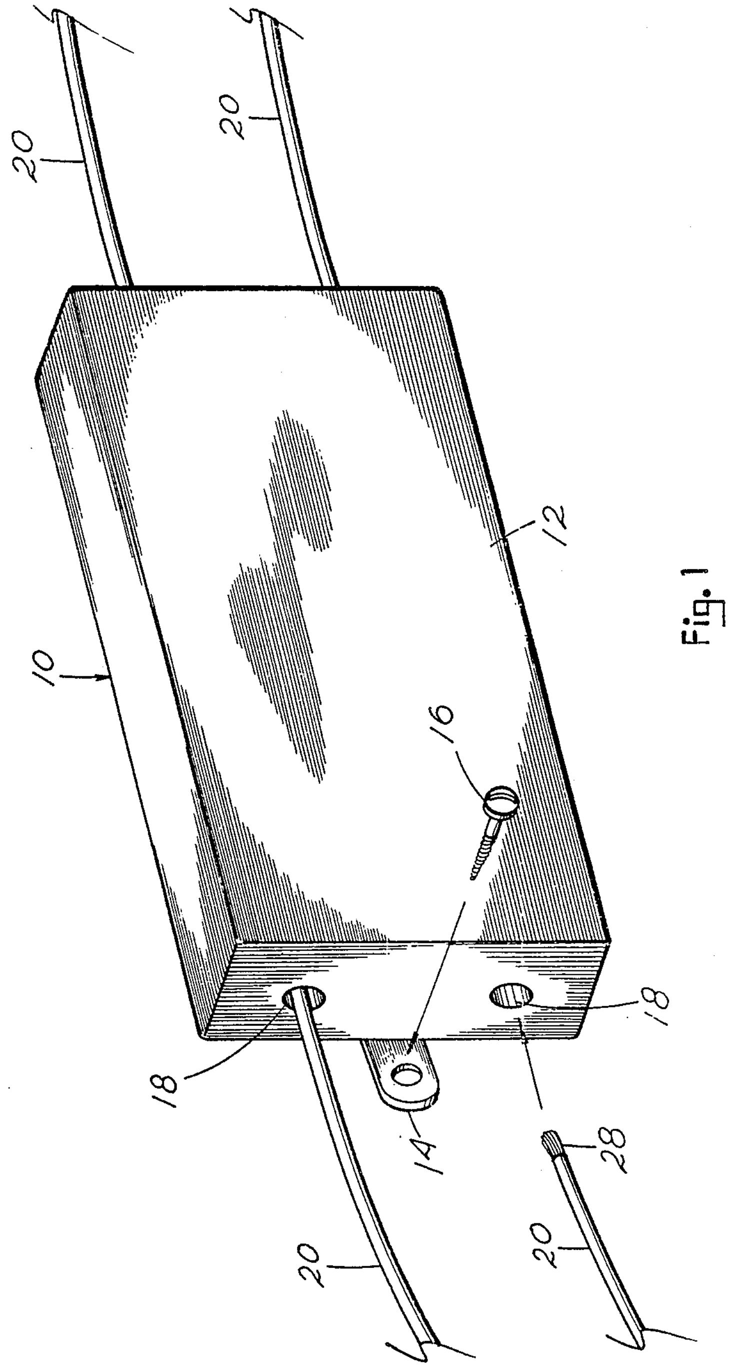
FIG. 1 the outer appearance or housing of the by-pass switching unit with wiring attached. A tab on one end is shown to allow stationary mounting of the housing.

Referring now to drawing FIG. 1 where a completed by-pass switching unit 10 is shown. The internal mechanics of by-pass switching unit 10 are housed in housing 12 which is preferably made of a dielectric plastic, but could be made of metal as long as proper electrical insulating procedures were followed for the electrically active components within the housing 12. Housing 12 desirably has one apertured mounting tab 14 to allow attachment of the housing 12 with a screw 16 to a suitable stationary surface. Housing 12 has four wire entrance openings 18, two openings 18 on each of two oppositely disposed sides to allow insertion of two insulated wires 20 into each end of the housing 12.

Figure 2A:
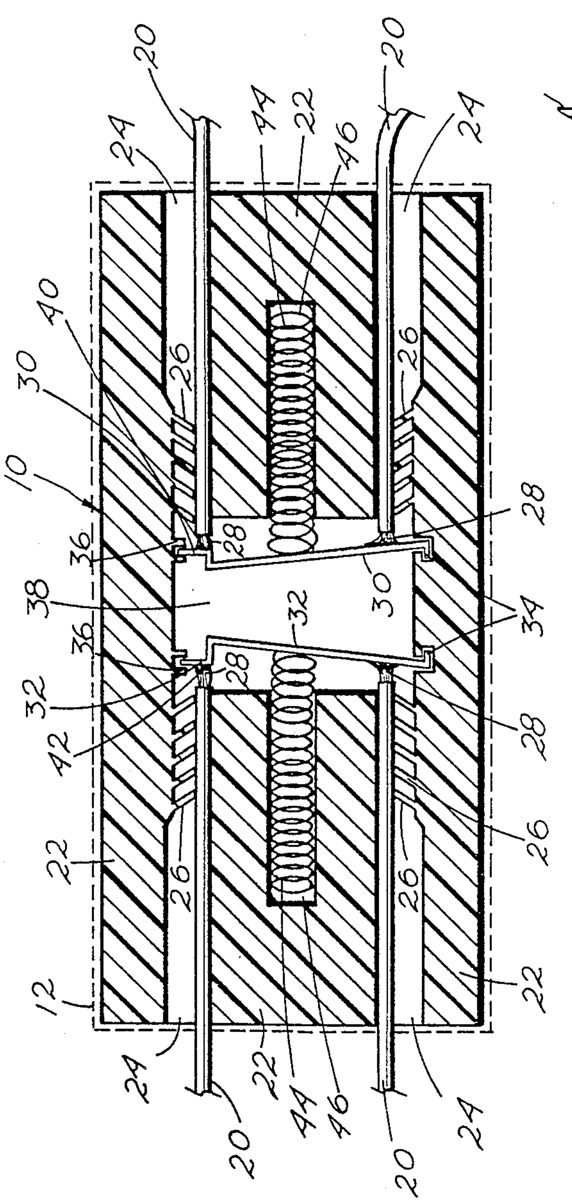
FIG. 2A is a partial cross-sectional view illustrating my by-pass switching device in a normal operating mode. The two metal strip forming the normally closed contacts against the two upper wires are shown closed.

Referring now mainly to drawing FIG. 2A where a partial cross-sectional view of by-pass switching unit 10 is shown to illustrate the internal mechanics of the device. In drawing FIG. 2A electrical insulating material 22 is shown within housing 12. Insulating material 22 has four open wire entrance channels 24 with the outward terminal end openings thereof aligning with wire entrance openings 18 of housing 12 to provided a guided passageway for wires 20. Within each entrance channel 24 are a number of flexible quick connect fingers 26 adapted to allow pushing of a wire 20 toward the center of unit 10 beyond the connect fingers 26 with the fingers 26 bending to allow passage of the wire 20. The connect fingers 26 are structured by way of length and angle to cause pinching of wire 20 against the surrounding insulation to prohibit removal of the wire. A small implement such as a screwdriver may be used to defeat the flexible connect fingers 26 to remove wire 20 after being inserted. Before insertion of a wire 20 into an entrance opening 18 and channel 24, the insulation on the wire 20 is stripped back a short distance, about $\frac{1}{8}''$ as shown in FIGS. 1 and 2A to expose the conductor 28 of the wire 20. Wire 20 is then pushed into entrance channel 24 where conductor 28 bottoms out against one end of a metal strip 30 or 32 depending on the side of insertion of the wire 20. At this bottomed out position, wire 20 is retained securely in place by connect fingers 26.

Figure 2B:
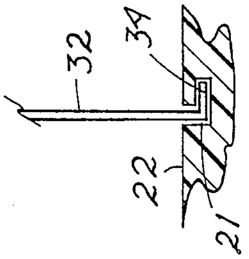
FIG. 2B illustrates in an enlarged view one suitable hinging structure for use in hingidly attaching one end of each metal conductive strip.

Within housing 12 are the two metal electrically conductive strips designated first metal strip 30 and second metal strip 32. The metal strips are supported at two oppositely disposed ends by structuring in insulation material 22. One end of each metal strip 30 and 32 is hingidly attached at hinge attachment 34 as shown in drawing FIGS. 2A and 2B. In drawing FIG. 2B, an enlarged view of a suitable hinge structure is shown with the hinge structure including a specifically shaped groove 21 formed in the insulating material 22 adapted to loosely receive and retain a thin metal strip 30 or 32 having a 90 degree bend at the end of each strip. The shape and width of the groove 21 on either side of the relatively thin metal strip 30 or 32 allows sufficient hinging and retainment for the application. Other hinging structures are anticipated, however this particular structure is inexpensive to make and fast to assemble. The oppositely disposed end of each metal strip 30 and 32 from hinge attachment 34 is loosely retained between a set of spaced apart insulating holding tabs 36 as shown in FIG. 2A. Metal strips 30 and 32 when in position are further retained by the two side panels of housing 12, when fully assembled the side panels prohibit the strips 30 and 32 from sliding laterally out of the retaining "slots" at each end. Using this retainment structuring for strips 30 and 32, the strips may be simply dropped into place during assembly before attachment of a top panel of the housing 12.

Metal strips 30 and 32 are preferably made of thin metal, however, it is anticipated that modern electrically conductive plastic could be substituted for the metal. Each strip 30 and 32 has an offset at the upper end as shown in FIG. 2A to allow each strip 30 and 32 when retained by insulating material 22 to be angled inward toward each other at one end. This angling positions one particular location on each strip closer to the other strip. Air space 38 separates the closest points between strips 30 and 32. The closest points between strips 30 and 32 form a predictable location for an electrical arc 64 to begin, being a shorter distance to jump, and thus a path of lessor electrical resistivity than the wider areas of air space 38 between the strip 30 and 32. In FIG. 2A four insulated wires 20 each having been stripped back to expose the conductor 28 of each wire have been installed into switching unit 10 with conductor 28 of each wire 20 abutted against metal strip 30 or 32. The abutment of a conductor 28 against the upper end of a strip 30 or 32 adjacent holding tabs 36 forms a normally closed contact. The normally closed contact of a conductor 28 abutting against strip 30 adjacent tabs 36 is designated N.C. contact 40, and the normally closed contact of a conductor 28 abutting against strip 32 adjacent tabs 36 is designated N.C. contact 42 as shown in FIG. 2A.

Also as shown in FIG. 2A, two compression springs 44 are retained in open channels within insulating material 22 designated spring housings 46, one housing 46 with one spring 44 therein adjacent each metal strip 30 and 32. Springs 44 are placed within spring housings 46 with one end of each spring 44 abutted against the back end of its spring housing 46, and the oppositely disposed end of each spring 44 abutted generally centrally against one of the metal strip 30 or 32. Compression springs 44 are of a length to apply continuous pressure against metal strip 30 or 32. Strips 30 and 32 are each sufficiently stiff at normal ambient temperatures to resist bending under the pressure applied by springs 44.

Figure 3:
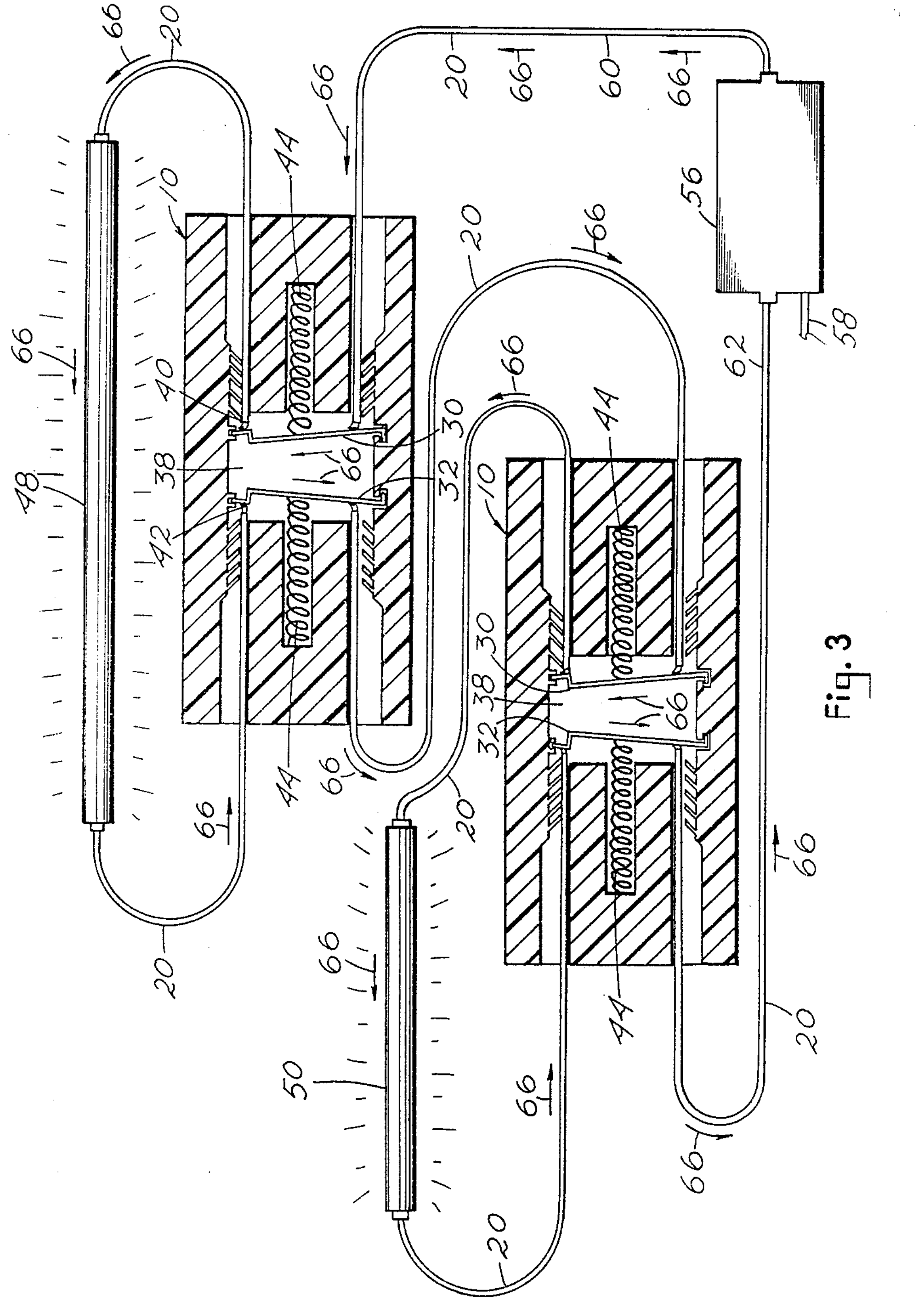
FIG. 3 illustrates a voltage transformer operating two neon lamps connected in series with each illuminant each having a by-pass switching unit connected in series therewith. Both by-pass switching units are shown partially cross-sectioned and in the normal operating mode. The lamps and by-pass switching units are shown on the secondary side (high voltage) of the transformer.
Figure 4:
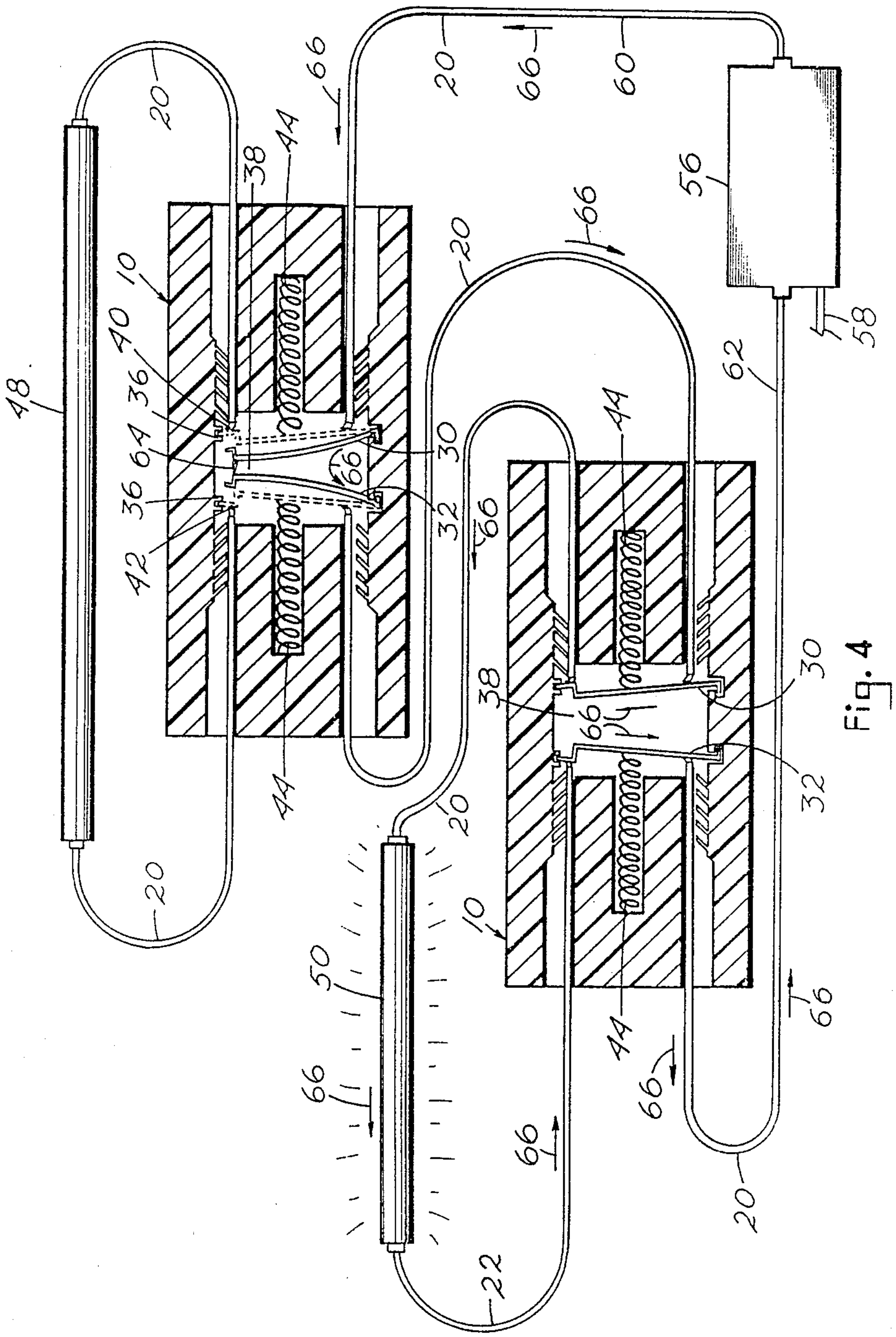
FIG. 4 illustrates the lighting arrangement shown in FIG. 3 with the top lamp burned out and its by-pass switching unit in the process of switching into the by-pass mode. The switching unit entering the by-pass mode is shown feeding power to the next by-pass switching unit and lamp in the circuit to maintain a completed circuit between the operating lamp and the transformer.
Figure 5:
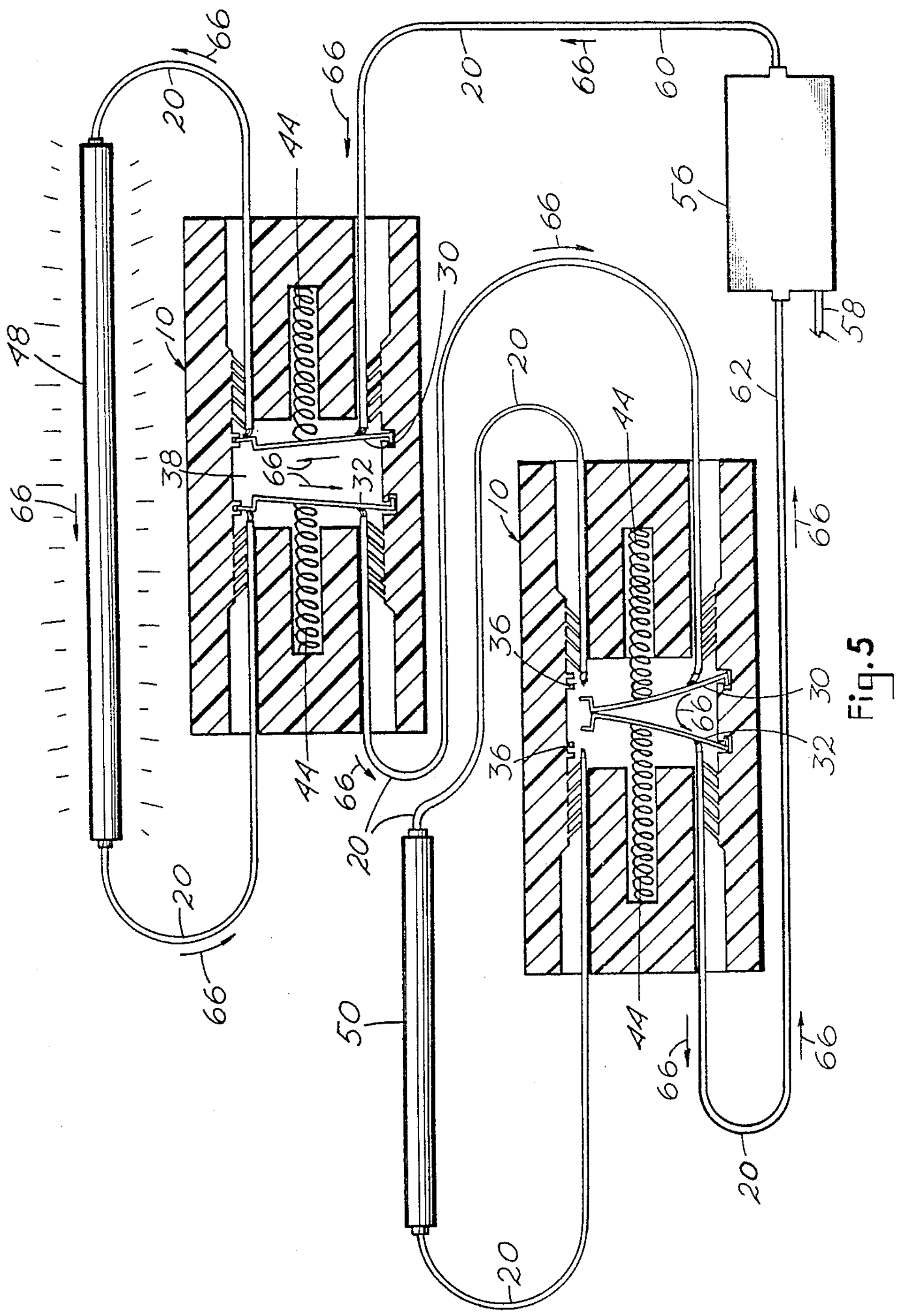
FIG. 5 rates the lighting arrangement shown in FIG. 3 with the bottom lamp burned out and its by-pass switching unit in the by-pass mode. The switching unit (bottom) in the by-pass mode is shown completing a return current flow path for the top operating lamp and its by-pass switching unit to maintain a completed circuit between the operating lamp and transformer.

Referring now to drawing FIGS. 3, 4, and 5 where two by-pass switching units 10 are shown with housings 12 removed to illustrate the internal workings. The switching units 10 are shown in use in a typical series connected lighting circuit having a neon lamp 48 at the top of the drawing, and a neon lamp 50 at the bottom of the drawing. A voltage transformer 56 with primary input lines 58 supplying electrical power to the transformer 56, and the transformer secondary insulated wire 20 exiting the transformer, one on each side, are shown supplying high voltage power to the lamps 48 and 50. The insulated wire 20 designated secondary output wire 60 is shown exiting the transformer 56 on the right, and insulated wire 20 designated secondary return wire 62. Flow arrows 66 are shown in the drawings to illustrate the flow path of the electrical current flowing through the series circuit.

In drawing FIG. 3, wire 60 is shown exiting from transformer 56 and entering the top switching unit 10 where wire 60 is electrically connected to the lower end of metal strip 30. An insulated wire 20 is shown electrically connected and forming N.C. contact 40 at the upper end of strip 30. From N.C. contact 40, wire 20 extends and electrically connects to one side of lamp 48. With this arrangement, strip 30 has been installed in series with the input wire 20 supplying lamp 48. Current passing through lamp 48 exits (returns) through wire 20 at the opposite end of the lamp. The return wire 20 for lamp 48 attaches to the upper end of metal strip 32 forming N.C. contact 42. From contact 42 the current flow path as shown by arrows 66 is through strip 32 and out the abutting conductor 28 of wire 20 at the lower end of strip 32. In this arrangement, strip 32 has been connected in series with the return wire 20 of lamp 48. From strip 32, the current flows through the wire 20 to enter the second switching unit 10 and connect to the strip 30 where it passes through strip 30, through wire 20 to supply lamp 50. The return wire 20 for lamp 50 has strip 32 connected in series. Current exiting strip 32 from lamp 50 is returned to transformer 56 by way of secondary return wire 62 to complete the circuit. Both switching units 10 are shown in the normal operating mode with both lamps 48 and 50 operational. Springs 44 are shown applying pressure to strip 30 and 32 of both units 10. Air space 38 is shown between strips 30 and 32, and no arcing between the strips is occurring because the path of least resistance to current flow is through the wires 20, strip 30 and 32 and the functioning lamps 48 and 50.

Referring now to drawing FIG. 4 where the same lighting arrangement that is shown in FIG. 3 is illustrated but with the upper lamp 48 burned out. The switching unit 10 connected in series with lamp 48 is illustrated in the process of switching from normal operating mode to by-pass operating mode. When lamp 48 burned out, the circuit was interrupted and the transformer voltage climbed to the open circuit transformer voltage which is about twice that of the operating transformer voltage. Due to the loss of the current flow path through lamp 48, the electricity is shown arcing through the air space 38, the path of least resistance. The arcing across strips 30 and 32 causes a rapid heating in the strips 30 and 32. The strips 30 and 32 soften with the heat generated by the arc 64. Springs 44 continue applying pressure to the strips 30 and 32 causing the softening strips to bow inward. The inward bowing in effect shortens the strips 30 and 32 causing them to dislodge from holding tabs 36 at the upper ends of the strips. Once released from holding tabs 36, strips 30 and 32 by way of springs 44 bend further toward each other by way of hinge attachment 34 until they contact each other at the upper ends. The bending of the strips 30 and 32 open the normally closed contacts 40 and 42 by pulling the strips away from the conductor 28 of wire 20 which abut them. The opening of the normally closed contacts removes the defective lamp 48 from the circuit. The contacting of strips 30 and 32 against each other allows continued current flow to the next switching unit 10 in the circuit and the lamp 50 connected in series with that switching unit 10. Lamp 50 continues burning.

Referring now to drawing FIG. 5 where the same lighting arrangement that is shown in FIG. 3 is illustrated but with the lower lamp 50 burned out. The switching unit 10 connected in series with lamp 50 is illustrated in the by-pass mode to supply a return current flow path to transformer 56 for the still operating lamp 48. The upper switching unit is shown in the normal operating mode in connection with lamp 48.

Figure 6:
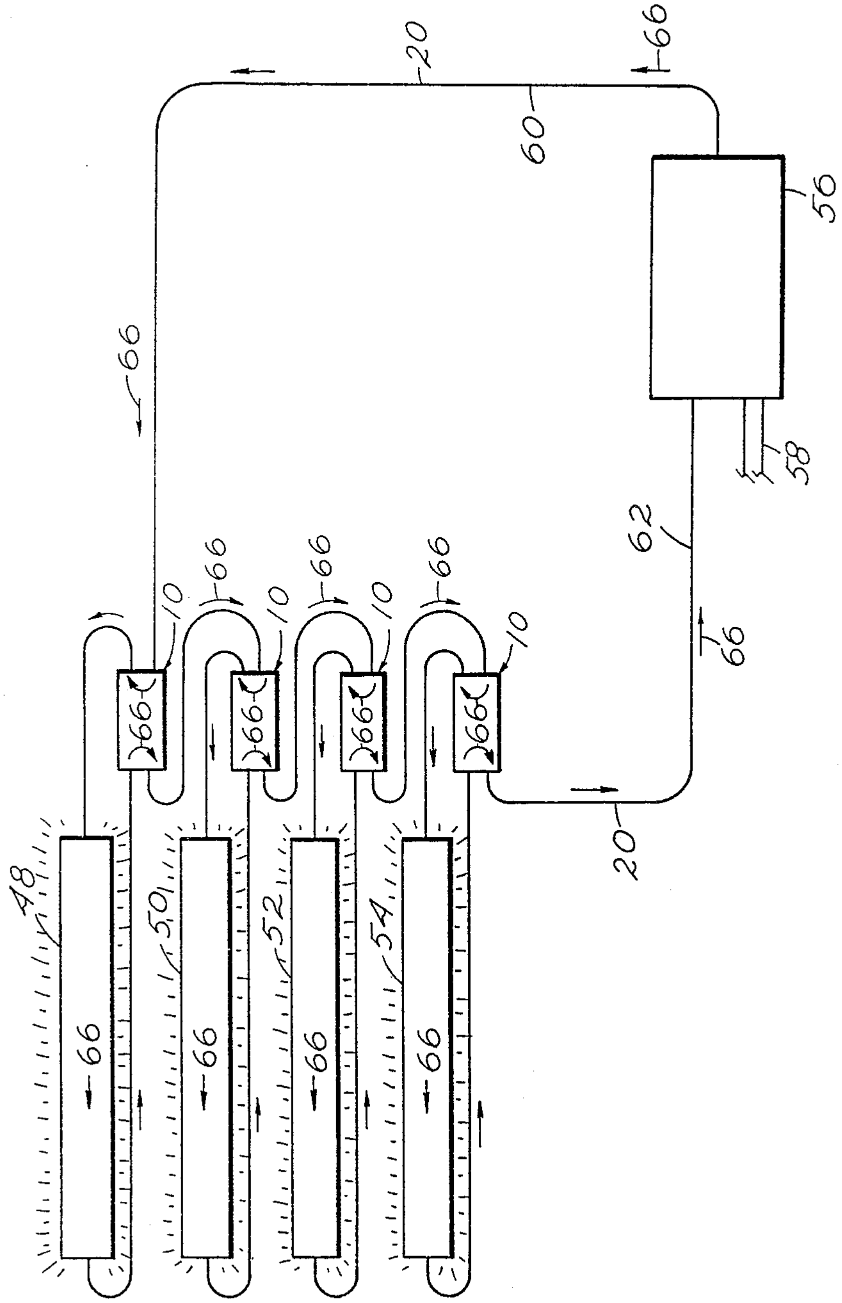
FIG. 6 illustrates four neon lamps connected in series to a transformer with each lamp having a by-pass switching unit connected in series with the lamp.

In FIG. 6, two additional lamps, lamp 52 and 54 have been added to the lighting circuit shown in FIGS. 3, 4, and 5. Current flow path arrows 66 illustrate the four switching units 10 all in the normal operating mode with four functioning lamps. The four lamps and the four switching units are all shown connected in series with each other.

Although I have described my invention in considerable detail to allow those skilled in the art to both make and use the invention, the detailing was for example only and is not intended to limit the scope of the appended claims.

What I claim is:

1. An automatic by-pass switching device, comprising;

a housing containing an electrical insulating material having a first electrically conductive strip and a second electrically conductive strip attached to said insulating material within said housing, said first and said second conductive strips being placed in a close proximity to each other with an air space therebetween; means adapted to allow electrical connection of said first conductive strip in series with a first electrical wire providing electricity to an operating electro-receptive device; means adapted to allow electrical connection of said second conductive strip in series with a second electrical wire providing a return path for said provided electricity when passing through said electro-receptive device in a circuit; said first and said second conductive strips adapted by way of said spacing therebetween to allow arcing of said electricity from said first conductive strip to said second conductive strip in an absence of an alternative electrical flow path of lessor electrical resistivity when said electro-receptive device becomes inoperative for said passage of said provided electricity therethrough; spring biasing means within said housing adapted to apply pressure to each said conductive strip towards each other, said conductive strips adapted to soften with heat generated by said arcing whereby said spring biasing means bends said softened first and second conductive strips, said bending of said softened conductive strips adapted to disconnect said electro-receptive device from at least one said electrical wire removing said electro-receptive device from said circuit, said bending further adapted to contact said first conductive strip against said second conductive strip, said contacting of said first conductive strip against said second conductive strip adapted to provide a flow path for said electricity to by-pass said inoperative electro-receptive device and continue flowing through said circuit.

2. An automatic by-pass switching device, comprising;

a housing containing an electrical insulating material having a first electrically conductive strip and a second electrically conductive strip attached to said insulating material within said housing, said first and said second conductive strips being placed in a close proximity to each other with an air space therebetween; means adapted to allow electrical connection of said first conductive strip in series with a first electrical wire providing electricity to an operating illuminant; means adapted to allow electrical connection of said second conductive strip in series with a second electrical wire providing a return path for said provided electricity when passing through said illuminant in a circuit; said first and said second conductive strips adapted by way of said spacing therebetween to allow arcing of said electricity from said first conductive strip to said second conductive strip in an absence of an alternative electrical flow path of lessor electrical resistivity when said illuminant becomes inoperative for said passage of said provided electricity therethrough; spring biasing means, said spring biasing means being two compression springs within said housing with one said spring pressuring against each said conductive strip, each said spring adapted to apply pressure to one said conductive strip towards the other said conductive strip, said conductive strips adapted to soften with heat generated by said arcing whereby said spring biasing means bends said softened first and second conductive strips, said bending of said softened conductive strips adapted to disconnect said illuminant from at least one said electrical wire removing said illuminant from said circuit, said bending further adapted to contact said first conductive strip against said second conductive strip, said contacting of said first conductive strip against said second conductive strip adapted to provide a flow path for said electricity to by-pass said inoperative illuminant and continue flowing through said circuit.

3. An automatic by-pass switching device, comprising;

a housing containing an electrical insulating material having a first electrically conductive strip and a second electrically conductive strip attached to said insulating material within said housing, said first and said second conductive strips being placed in a close proximity to each other with an air space therebetween; means adapted to allow electrical connection of said first conductive strip in series with a first electrical wire providing electricity to at least two operating illuminants connected in series in a circuit; means adapted to allow electrical connection of said second conductive strip in series with a second electrical wire providing a return path for said provided electricity when passing through a first illuminant of said series connected at least two operating illuminants; said first and said second conductive strips adapted by way of said spacing therebetween to allow arcing of said electricity from said first conductive strip to said second conductive strip in an absence of an alternative electrical flow path of lessor electrical resistivity when said first illuminant becomes inoperative for said passage of said provided electricity therethrough; spring biasing means, said spring biasing means being two compression springs within said housing with one said compression spring pressuring against each said conductive strip, each said compression spring adapted to apply pressure to one said conductive strip towards the other said conductive strip, said conductive strips adapted to soften with heat generated by said arcing whereby said spring biasing means bends said softened first and second conductive strips, said bending of said softened conductive strips adapted to disconnect said first inoperative illuminant from at least one said electrical wire removing said first inoperative illuminant from said circuit, said bending further adapted to contact said first conductive strip against said second conductive strip, said contacting of said first conductive strip against said second conductive strip adapted to provide a flow path for said electricity of said circuit to by-pass said first inoperative illuminant and to continue flowing through said circuit to feed through a second said by-pass switching device connected in series between said two illuminants in order to continue operating the remaining said illuminant in said circuit.

* * * * *